(No Model.) 5 Sheets—Sheet 2.
C. P. HIGGINS.
WROUGHT METAL HEADER AND MEANS FOR MANUFACTURING SAME.
No. 553,912. Patented Feb. 4, 1896.
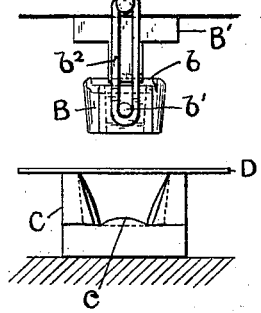
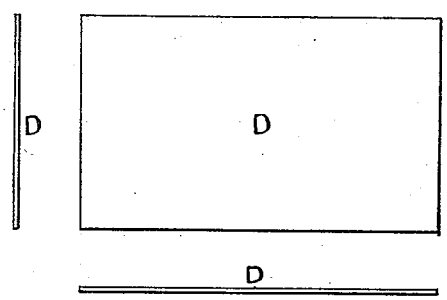
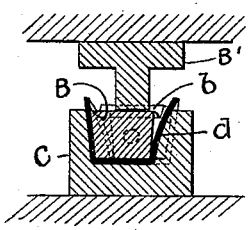
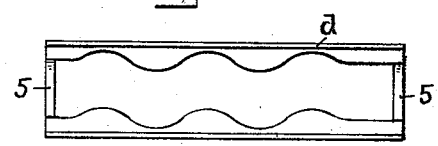
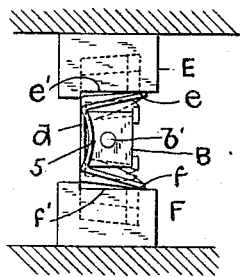
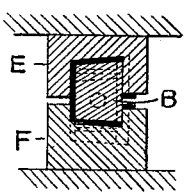
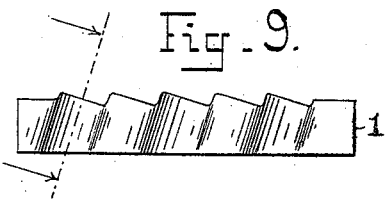
Witnesses
Chas Hanimann
Edson Salisbury Jones
Campbell P. Higgins Inventor
By his Attorney (No Model.) 5 Sheets—Sheet 4.

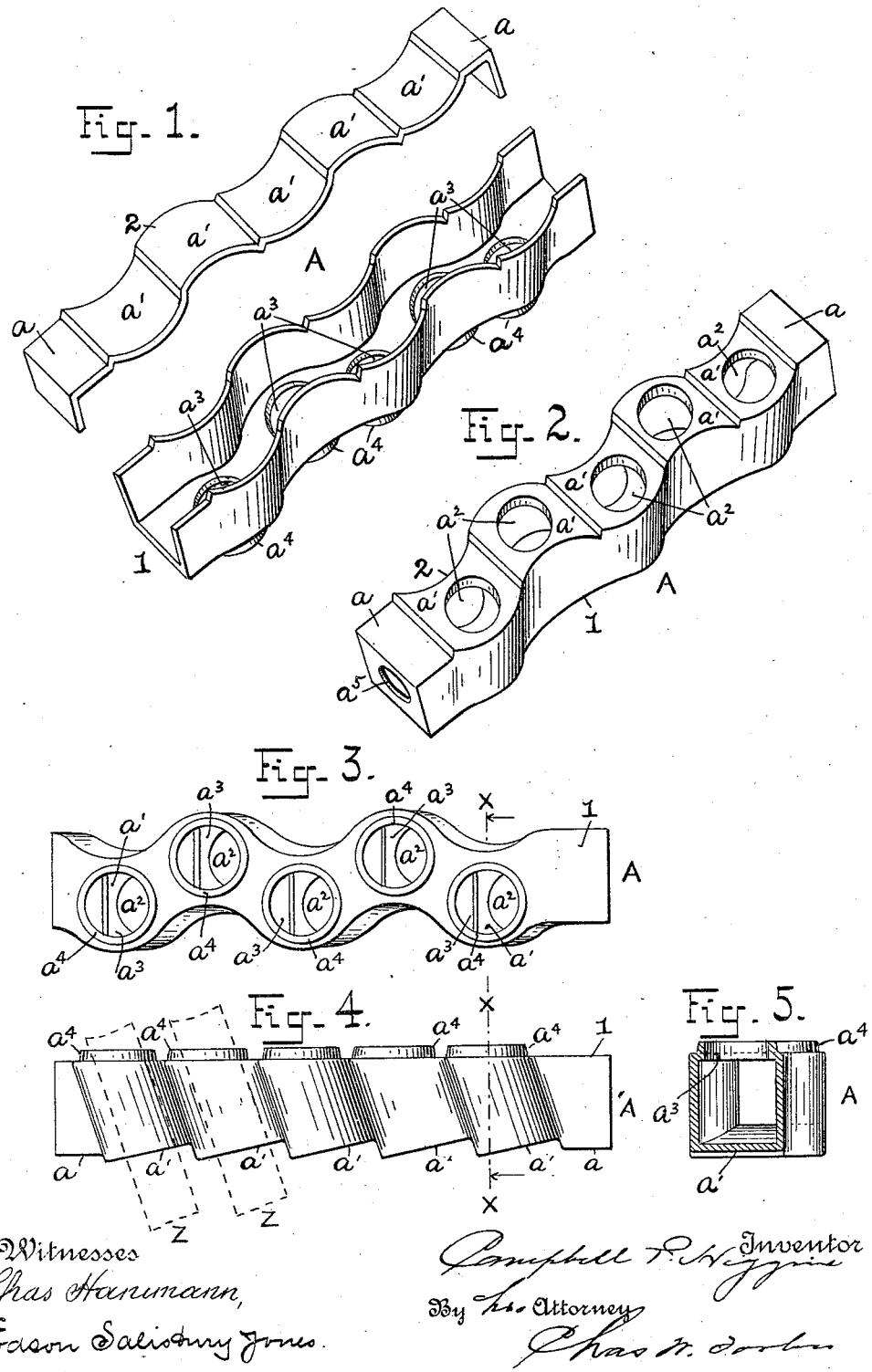

C. P. HIGGINS.
WROUGHT METAL HEADER AND MEANS FOR MANUFACTURING SAME.

No. 553,912. Patented Feb. 4, 1896.

(No Model.) 5 Sheets—Sheet 5.
C. P. HIGGINS.
WROUGHT METAL HEADER AND MEANS FOR MANUFACTURING SAME.
No. 553,912. Patented Feb. 4, 1896.
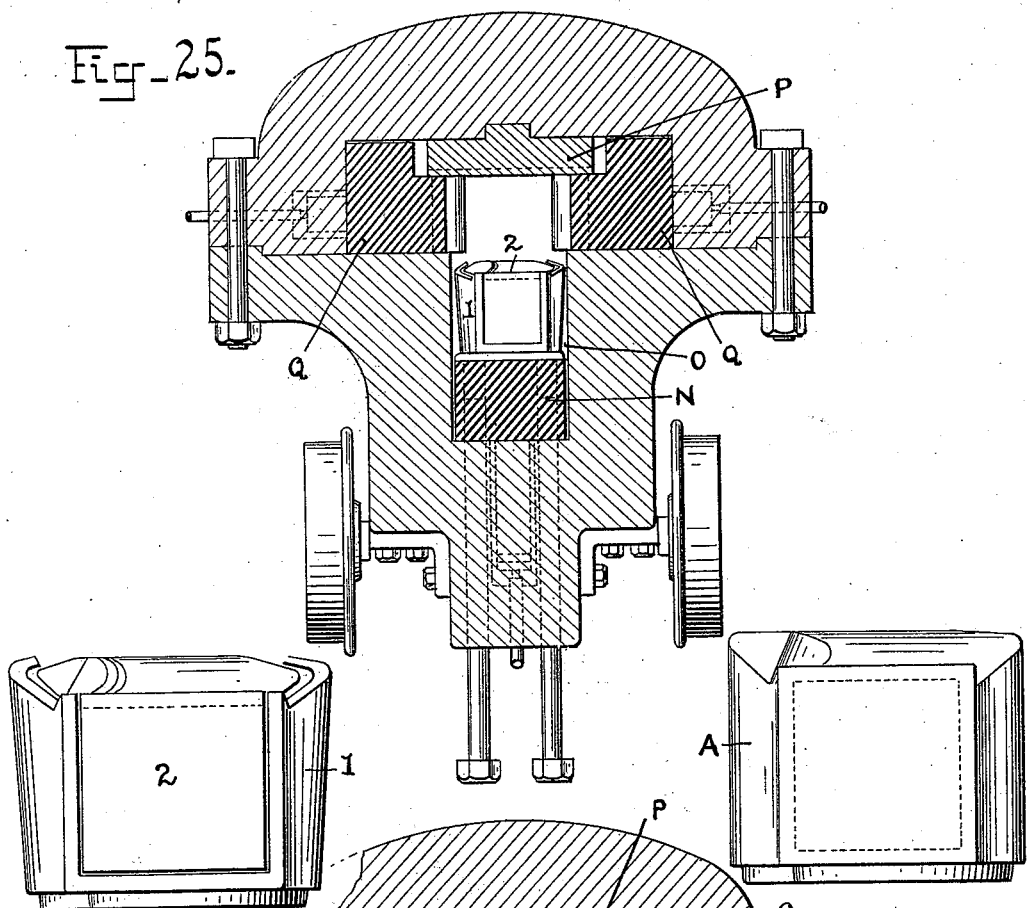
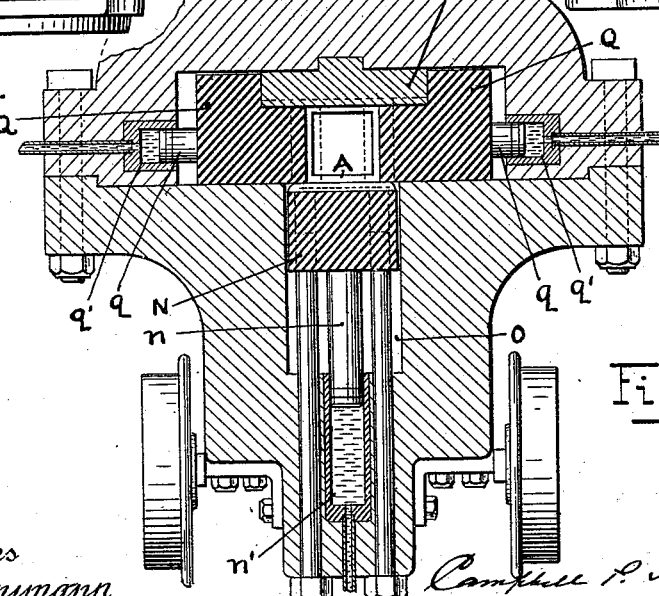

UNITED STATES PATENT OFFICE.

CAMPBELL P. HIGGINS, OF ROSELLE, NEW JERSEY.

WROUGHT-METAL HEADER AND MEANS FOR MANUFACTURING SAME.

SPECIFICATION forming part of Letters Patent No. 553,912, dated February 4, 1896.

Application filed February 11, 1895. Serial No. 537,928. (No model.)

*To all whom it may concern:*

Be it known that I, CAMPBELL P. HIGGINS, a citizen of the United States, residing at Roselle, in the county of Union and State of New Jersey, have invented certain new and useful Improvements in Wrought-Metal Headers and Means for Manufacturing the Same, of which the following is a specification.

This invention relates to the manufacture of those parts of a sectional steam-generator known as the "headers," to which parts the ends of the water-tubes are connected.

The invention consists in a header composed of two parts which are welded together, the finished header having sinuous sides and a face provided with a series of zigzag depressions that furnish faces at right angles to the inclined tubes which they receive.

It consists, also, in a header having sinuous sides, the corrugations in which are inclined with relation to the hand-hole face of the header, so that the water-tubes can be inserted and withdrawn through the hand-holes without interference from said corrugations.

It further consists in certain improvements in means for forming the header, all as hereinafter described and claimed.

Figure 18:
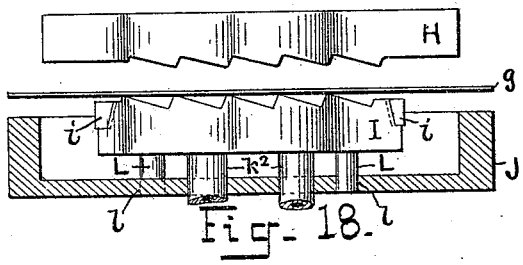
Figure 14:
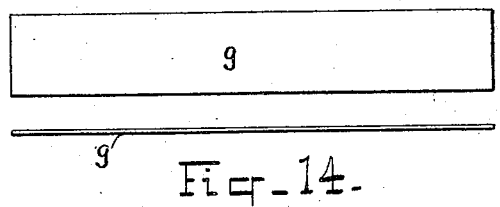
Figure 19:
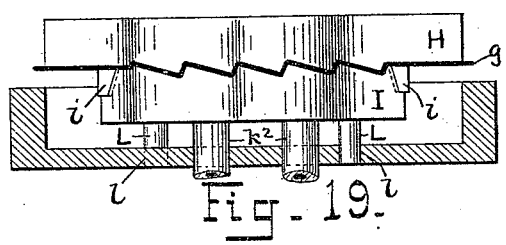
Figure 15:
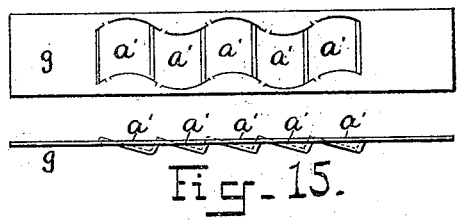
Figure 20:
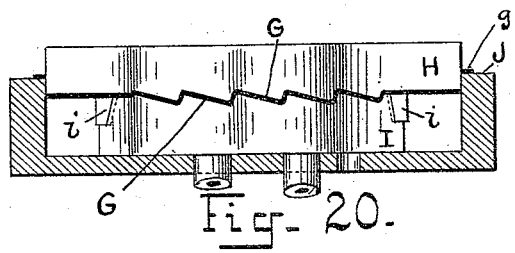
Figure 16:
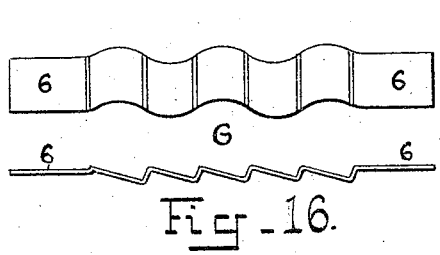
Figure 21:
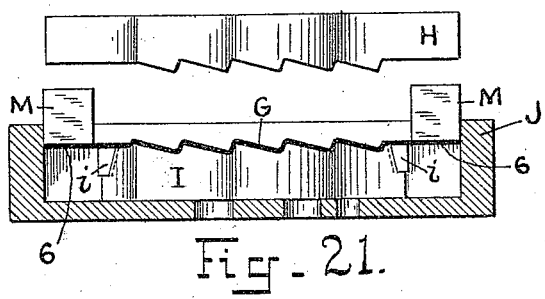
Figure 22:
Figure 17:
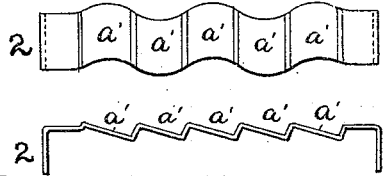
Figure 23:
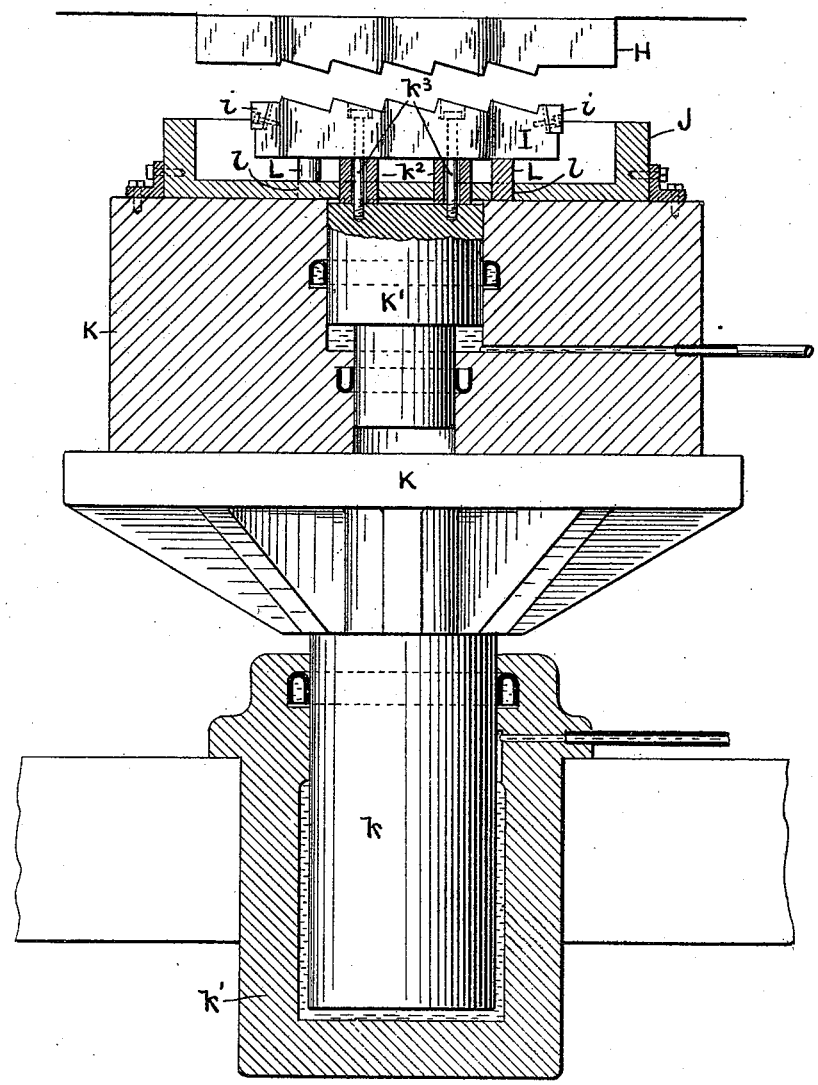

In the accompanying drawings, Figure 1 represents in perspective the two parts of the header, which have been formed by dies, the upper half in the view having a series of zigzag faces and the lower half a series of flanged openings. Fig. 2 shows the completed header in perspective. Fig. 3 represents a plan view of the hand-hole face of the same. Fig. 4 shows a side view of the header when completed. Fig. 5 represents a transverse section of the same on line *x x* of Figs. 3 and 4. Fig. 6 shows, on a smaller scale, a plan and two edge views of a plate from which the trough-shape portion of the header may be made. Fig. 7 represents an interior plan view, an end and a side view of such portion of the header partially completed or in rudimentary form. Fig. 8 shows a top and an end view of such portion of the header after the sides thereof have been fully corrugated into serpentine form and the top edges have been serrated. Fig. 9 shows a side view of the same. Fig. 10 represents an end view of two dies for stamping up such portion of the header into rudimentary form with the plate on one of them. Fig. 11 shows a transverse section of said dies when brought together to perform their office on said plate. Fig. 12 represents an end view of two other dies for operating upon such rudimentary portion of the header fully to corrugate the sides thereof and trim its upturned edges and ends, and an end view of such header portion in place between the dies and located upon the upper die shown in Fig. 10. Fig. 13 shows a transverse section of said dies and said header portion after the dies have been brought together to perform their office. Fig. 14 represents a plan and edge view of a plate from which the tube-receiving portion of the header may be made. Fig. 15 shows a plan and edge view of said plate after the same has been stamped by dies to produce zigzag impressions or indentations with sinuous edge outlines upon the plate. Fig. 16 represents a plan and edge view of the blank for such part of the header after it has been cut out of the plate. Fig. 17 shows a plan and edge view of the same after the ends have been bent at right angles. Fig. 18 represents a side view of two dies for producing the indentations shown in Fig. 15, the plate being in place on one of the dies and the lower die being supported on blocks and a longitudinal section of a shearing-die. Fig. 19 represents a similar view of said dies and plate after the indenting-dies have been brought together to perform their office. Fig. 20 shows a similar view of all the dies after the block-supports of the lower die have been withdrawn and the upper die has moved downward to cut out the blank. Fig. 21 represents the same dies with the upper one raised and blocks placed upon the end portions of the blank preparatory to bending down said ends. Fig. 22 shows a similar view of the dies and blocks after the ends of the blank have been bent. Fig. 23 represents in partial elevation and vertical section a hydraulic press in which the dies shown in Figs. 18 to 22 may be used. Fig. 24 represents an end view of the two header parts placed together in readiness to be heated. Fig. 25 shows, in transverse section, an apparatus suitable for welding the parts together with said parts represented in end view therein in readiness to be operated upon.

Fig. 26 shows a similar view of the welding apparatus when the movable blocks have been brought together to complete the welding. Fig. 27 represents an end view of the completed header.

The header A (shown in Figs. 1 to 5) is of that variety which is intended to occupy a vertical position, and its tube-face $a$ is made zigzag in contour, as particularly shown in Figs. 2 and 4, so that the inclined faces $a'$, which are provided with tube-receiving holes $a^2$, shall be at right angles to the inclined tubes that said face receives.

The sides of the header are sinuous in outline, as shown in Fig. 3, in order to connect the tubes in a staggered relation, which is well understood, and the corrugations of said sinuous sides, in place of being at right angles to the hand-hole face of the header, are at right angles to the inclined faces $a'$ of the tube-receiving face, so that the tubes may be inserted and withdrawn through the hand-holes without interference from said corrugations, (as would be the case were the latter at right angles to the hand-hole face of the header,) as shown in Fig. 4, where tubes Z (represented by dotted lines) are indicated as being inserted or withdrawn through the hand-holes.

The complete header is made of two parts 1 and 2, Fig. 1, which are cut out of and stamped up from plates into the forms shown, the part 1 being subsequently furnished with hand-holes $a^3$, that are surrounded by projecting circular flanges $a^4$, upon which the hand-hole plates are to be clamped.

In the formation of the header part 1 two dies, as B C, Figs. 10 and 11, are first employed to form a plate D, Fig. 6, into the trough-shape rudimentary header part $d$. (Shown in Fig. 7.) These dies may be mounted in any suitable press, and to take the thrust on the die B a backing-block B', Figs. 10 and 11, is shown as being employed, which block should be so arranged that it can be slid from behind the die B. This die is so mounted that it can be partially rotated, and it is shown as hung up by end pivots $b'$ in links $b^2$. The plate is placed upon the die C, as shown in Fig. 10, and the dies are brought together, as shown in Fig. 11, thereby producing the trough shown in Fig. 7, the upper edges of which are straight, the bottom having sinuous side outlines, and the sides only partially corrugated.

As plates come from the rolling-mill in differing lengths, it is necessary that they be trimmed, at some time, to the length of the finished header; but to avoid the expense of a separate operation for this purpose, provision is preferably made whereby the trimming is done during the formation of the completed trough. The first step toward this trimming is the production on the ends of the rudimentary trough $d$, and at the time it is formed, of raised straps or pieces 5, which are cut from the bottom of the trough but are not detached at their ends from its sides, as clearly shown in the end view, Fig. 7. To produce these straps, the die C has a raised portion $c$, Fig. 10, at each end, and the length of the die B is made slightly less than the distance between the adjacent sides of said die portions.

The contours of the sides of the cavity in the die C are the same as those of the rudimentary header part $d$, which is produced therein; but the contours of the sides of the die B are those of the sides of the finished trough, as it is designed to use the latter die as a mandrel upon which the final shape is given to the sides of the finished header part 1, and the top surface $b$ of the die B, Fig. 10, is serrated, in the same form as the top edges of the finished trough shown in Fig. 9.

When the dies B C are separated, the rudimentary header part $d$ will stick to the die B. The backing-block B' is now slid from behind the die B, the die C is slid from under the die B, and said die is turned one-fourth of a revolution on its pivots $b'$. Two other dies E F are now moved into vertical alignment with the die B, the three dies assuming the relations shown in Fig. 12.

The dies E F, in conjunction with the die B, perform two offices, one being to complete the corrugation of the sides of the part 1 and the other to trim off the ends of the rudimentary trough and produce the zigzag outline on the top edges thereof. Both of these results are accomplished when the dies are brought together, as shown in Fig. 13, the four edges of each of the die-cavities E F acting as cutters. The edges $e\, f$ trim the top edges of the trough into the proper zigzag outline, while the edges $e'\, f'$ cut off the ends of the trough until the cut previously made to produce the straps 5 is met, thereby producing the finished trough shown in Figs. 8 and 9. The hand-holes $a^3$ and surrounding flanges $a^4$ (shown in Figs. 1 and 3) may now be produced on this header part by suitable means, as properly-shaped punches and formers, in a well-understood way.

The header part 2 is formed from a plate, as $g$, Fig. 14, by means of suitable dies and formers, such means being shown in Figs. 18 to 22, and for operating the same a hydraulic press may be employed—such, for instance, as shown in Fig. 23. The dies represented are three in number, H, I and J, the last being secured upon the ram K, from which depends a piston $k$, working in a cylinder $k'$. The die I is shown as secured to an auxiliary ram K' and upon interposed tubular supports $k^2$ by bolts $k^3$, the supports $k^2$ passing loosely through holes in the bottom of the die J. Additional supports L to the die I are also preferably employed, the said supports being laterally removable and inserted in slots $l$ in the die J.

The dies H and I have faces of a zigzag contour and sinuous sides, while the lower edges of the die H in conjunction with the upper edges of the cavity in the die J act as cutters at the proper time.

The parts being in the relative positions shown in Figs. 18 and 23, a plate $g$ is placed upon the die I and the dies H and I are brought together, as shown in Fig. 19, by an upward movement of the ram K, thereby producing on the plate a series of zigzag depressions $a'$, having sinuous side outlines, as shown in Fig. 15. The ram K is now allowed to recede and the auxiliary ram K' is slightly elevated to allow the blocks L to be withdrawn. This being done the ram K' is allowed to recede until the die I rests upon the bottom of the cavity in the die J. The ram K is now elevated to bring the dies together, as shown in Fig. 20, thereby causing the dies H and J to cut out of the plate the blank G. (Shown in Fig. 16.) The ram K is now allowed to recede and forming-blocks M are placed upon the ends 6 of the blank G, as shown in Fig. 21, when the ram K is again elevated to cause the ends 6 of the blank to be bent downward at right angles, as shown in Figs. 22 and 17, thereby producing the header part 2. (Shown in Fig. 1.) The ram K now recedes to separate the dies, leaving the header part and the blocks M in the die J. The ram K' is now elevated to raise the die I to its original position, preparatory to removing the header part therefrom.

As the header part closely hugs the ends of the die I, and considerable force would be required to remove it, the die I is preferably constructed to facilitate the operation by making its lower portion of less length than its upper portion and providing the ends of the latter portion with wedge-shape blocks $i$, which are dovetailed or otherwise secured to the die, so they can move upward in an inclined direction. When the header part is seized and raised, therefore, the blocks $i$ will be elevated and will approach each other, thereby freeing the header part and enabling it to be easily withdrawn. The two header parts, which are now ready to be welded together, are assembled, as shown in Fig. 24, by placing the part 2 within the part 1, and the parts are then put into a proper furnace, where they are brought to a welding heat. From this furnace they are removed into a welding apparatus—such, for instance, as shown in transverse section in Figs. 25 and 26, where they rest upon a bed-block N. This block is preferably provided with a series of pistons $n$ (one being shown in Fig. 26) that work in cylinders $n'$, so that the block can be raised by hydraulic pressure. The block N is arranged to move in a channel O, the width of which is slightly greater than the header, and the upper part of the apparatus is furnished with a head-block P, the lower face of which conforms to the upper face of the header and receives the same when the block N is forced upward. The pressure exerted on the header by such upward movement of the block N welds the lower edges of the downturned ends of the part 2 to the bottom of the part 1. The apparatus is also provided with two laterally-movable blocks Q Q, each of which is furnished with a series of pistons $q$ working in cylinders $q'$, as shown in Fig. 26, the adjacent faces of said block conforming to the sides of the finished header. These blocks are now made to approach each other by hydraulic pressure, to force the sides of the part 1 toward each other and to weld the same to the edges of the part 2 throughout their length, thereby completing the welding operation and the header, as shown in Fig. 27.

The holes $a^2$ and $a^5$ may be punched in the part 2 before welding, but in order to avoid any possible distortion of said holes during the welding they are preferably produced after such operation by boring, though the holes $a^2$ may be made by punches introduced through the hand-holes after the parts have been welded together.

What I claim, and desire to secure by Letters Patent, is—

1. A header, for sectional steam-generators, composed of a trough-shape part having sinuous sides with serrated edges, and a second part having bent ends and a zigzag face, which latter part fits the trough and is secured to it, substantially as set forth.

2. A header, for sectional steam-generators, composed of a trough-shape part having sinuous sides with serrated edges, the corrugations in which sides are inclined as described, and a second part having bent ends and a zigzag face, which latter part fits the trough and is secured to it, substantially as set forth.

3. A header, for sectional steam-generators, provided with a series of hand-holes and with a zigzag tube-hole face and having sinuous sides the corrugations in which are inclined as described, whereby the boiler-tubes may be inserted and withdrawn through said holes without interference from said corrugations, substantially as set forth.

4. In a machine for making the trough-shape part of a header, the combination of two formers, one of which has the shape of the finished trough, and the other is approximately of such shape and is furnished with projections for partially detaching end straps from the rudimentary trough; and two other formers which give the sides of the trough their finished outline and trim the same to its finished length, substantially as set forth.

5. In a machine for making in two parts a header for steam-generators, the combination of the following elements; two formers for making a trough-shape part, one of which formers is of the approximate shape of the part and the other of its finished shape; two formers that give the sides of said part their finished outline and trim the same to its finished length; and formers, substantially as described, for making the other part with a zigzag face and bent ends, to fit said trough-shape part, substantially as set forth.

6. The die, I, having the diagonally-movable end blocks, substantially as and for the purpose specified.

7. The die, I, having its lower portion of less length than its upper portion and such latter portion provided with diagonally-movable end blocks, substantially as and for the purpose specified.

CAMPBELL P. HIGGINS.

Witnesses:
HARRY MCARDLE,
CHAS. EDGAR MILLS.